United States Patent [19]
McFarland

[11] 3,778,828
[45] Dec. 11, 1973

[54] RANGE-GATED DIGITAL AMTI SYSTEM

[75] Inventor: Wilmer H. McFarland, Fullerton, Calif.

[73] Assignee: North American Rockwell Corporation, El Segundo, Calif.

[22] Filed: Feb. 27, 1967

[21] Appl. No.: 618,823

[52] U.S. Cl. ............... 343/7.7, 328/151, 343/5 DP
[51] Int. Cl. .............................................. G01s 9/42
[58] Field of Search ............... 343/5 DP, 7.3, 7.7; 328/151, 165

[56] References Cited
UNITED STATES PATENTS
3,720,942  3/1973  Wilmot et al. ................. 343/7.7
3,725,923  4/1973  Bosc et al. .................... 343/7.7
3,737,900  6/1973  Vehrs ......................... 343/5 DP X Primary Examiner—T. H. Tubbesing
Attorney—William R. Lane, L. Lee Humphries and Rolf M. Pitts

[57] ABSTRACT

A pulsed energy system for airborne use and having range-gated digital means for doppler processing of moving-target signals. A digitizer generator provides a first pulse train, indicative of the video output of the system receiver, as an up-count input to an up-down counter. An adjustable pulse train, (corresponding to the function $V_a \cos \theta$) is applied as a down-count input to the up-down counter. A synthetic video, or display, signal is gated-on in response to an overflow condition of the up-down counter.

23 Claims, 10 Drawing Figures

RANGE-GATED DIGITAL AMTI SYSTEM

CROSS-REFERENCE TO RELATED APPLICATIONS

1. Application Ser. No. 391,073, filed Aug. 18, 1964, by F. J. Dynan, et al., for AMTI Radar System, now U.S. Pat. No. 3,408,647.
2. Application Ser. No. 552,556, filed May, 24, 1966, by W. R. Fried, et al, for Platform Motion Compensation of a Coherent MTI System, now U.S. Pat. No. 3,341,847.

BACKGROUND OF THE INVENTION

The utility of a non-coherent doppler processor in a pulsed energy system, such as an airborne radar system for the detection of moving targets, has been described in a copending application Ser. No. 391,073 for an AMTI Radar System, filed Aug. 18, 1964, by F. Dynan et al., assignors to North American Aviation, Inc., assignee of the subject invention. The display of a substantially clutter-free moving target by means of employing such non-coherent doppler processor, relies on the presence of a substantial clutter content in the received signals, which gives rise to a clutter-referenced moving target signal which may be spectrally distinguished from the d-c, or low-frequency, energy of the detected clutter content. For such purpose a high-pass, analog doppler filter is employed, having an upper corner frequency (or cut-off frequency) not exceeding one-half the pulse repetition interval of the pulsed energy system employing such device.

Such prior-art arrangement has several inherent disadvantages. First, the doppler processor requires a substantial storage medium for storing a plurality of successive range trace signals (several hundred or more) for creating a data matrix of range bin versus pulsed interval, in order that the data in a given range bin may be sequentially scanned (in the same sequence as the occurrence of the pulsed intervals in which the data were recorded), in order to reconstruct the clutter-referenced moving target spectra. Secondly, the fixed bandpass of the analog doppler filter means may respond to the clutter spectra, as the bandwidth of the clutter spectra spreads with increases in platform velocity and with changes in look-angle (in a scanning system); while a moving target may not be detected, even though spectrally distinguishable from the clutter and below the fixed bandpass of the high-pass analog doppler filter. The blind-speed effects imposed by the use of fixed bandpass analog filters may be relieved to some extent by the use of filter chains comprising severally switchable narrow-bandpass filters for covering a doppler bandpass of interest, as described in the above noted copending application Ser. No. 391,073. However, such switching of discrete portions of the bandwidth merely tends to reduce, rather than avoid, such effects. Also, the attempt to use narrow band analog filters involves the problem of filter "ringing" or undamped responses which tend to persist some time after the application of the input giving rise to such response, thereby worsening the range resolution of the display signal. Further, use of a filter chain of severally switchable analog filters involves the necessity of switching logic, without yet providing a continuously adjustable lower corner-frequency.

SUMMARY OF THE INVENTION

By means of the digital doppler filter concept of the subject invention, the above-noted shortcomings and disadvantages of prior art analog AMTI processors are avoided.

In a preferred embodiment of the invention there is provided a periodically-sampled video signalling system such as an airborne moving target indicating type of range-gated pulsed energy ranging system. Also provided is a bandpass-limited digital filter, useful for application as a doppler processor, and comprising a digitizer responsive to a sampled video signal for providing a pulse train indicative of a non-zero frequency spectral content of the sampled video. Such digitizer may also include threshold means for limiting the output response to such spectral component only where above a preselected threshold amplitude. Periodic pulse generating means provides an output having a periodicity corresponding to a selected lower limit bandpass frequency. An output up-down counter having an up-count input responsive to the output of the digitizer and having a down-count input responsive to the output of the periodic pulse generating means provides an overflow condition indicative of the presence of a video envelope spectral component in the frequency region above the lower limit frequency, which overflow condition may be utilized in an AMTI system for generating a synthetic video AMTI signal for display purposes.

By means of the above described digital arrangement, doppler filtering may be accomplished in an AMTI system without the necessity of storing hundreds of successive range trace signals. Only one range-gated range-trace signal is stored in the digitizer for comparison purposes in the processing of the next subsequently occurring range trace signal. Therefore, the large storage capacity of previous range-gated data matrix systems is neither required nor employed. Also, because of the digital counter overflow technique employed for indicating the presence of a video envelope spectral component above a selected lower limit frequency, the resolution problems associated with filter "ringing" (whether an underdamped analog filter or a digital differential analyzer equivalent is employed) are avoided. Further, the use of a down-count pulse train of adjustable periodicity for establishing the lower limit frequency of the bandpass response of the output down counter provides highly effective means of selectively varying the filter bandpass.

In this way, the lower limit frequency in a doppler filter application for an AMTI system may be either increased in order to avoid inadvertent response to a broadening of the clutter spectra due to changes in system look-angle or increases in platform velocity; or may be decreased as the clutter spectrum is narrowed, in order to detect moving targets below an initial lower limit bandpass frequency and outside the narrowed clutter spectra. Further, such convenient means for varying the doppler filter bandpass obviates the need for discrete switching of the filters of a filter chain.

Moreover, where thresholding is included in the digitizer, the presence of a moving target may be detected amid the skirt of the clutter sectrum with less likelihood of a pulse alarm occurring from a system response to such skirt of the clutter spectrum, itself, or to noise.

Accordingly, it is a broad object of the invention to provide an improved AMTI processor.

It is another object of the invention to provide a digital filter having no "ringing" problem.

It is still another object to provide a digital filter having an adjustable lower bandpass limit frequency.

A further object is to provide a digital doppler processor.

Yet another object is to provide a digital doppler processor having an adaptive lower bandpass limit frequency which may be automatically varied in response to an arbitrary function.

These and other objects of the invention will become more readily apparent from the following description taken in conjunction with the accompanying drawings, in which:

BRIEF DESCRIPTION OF THE DRAWINGS

In the figures, like referenced elements refer to like parts.

DESCRIPTION OF THE PREFERRED EMBODIMENTS

Figure 1:
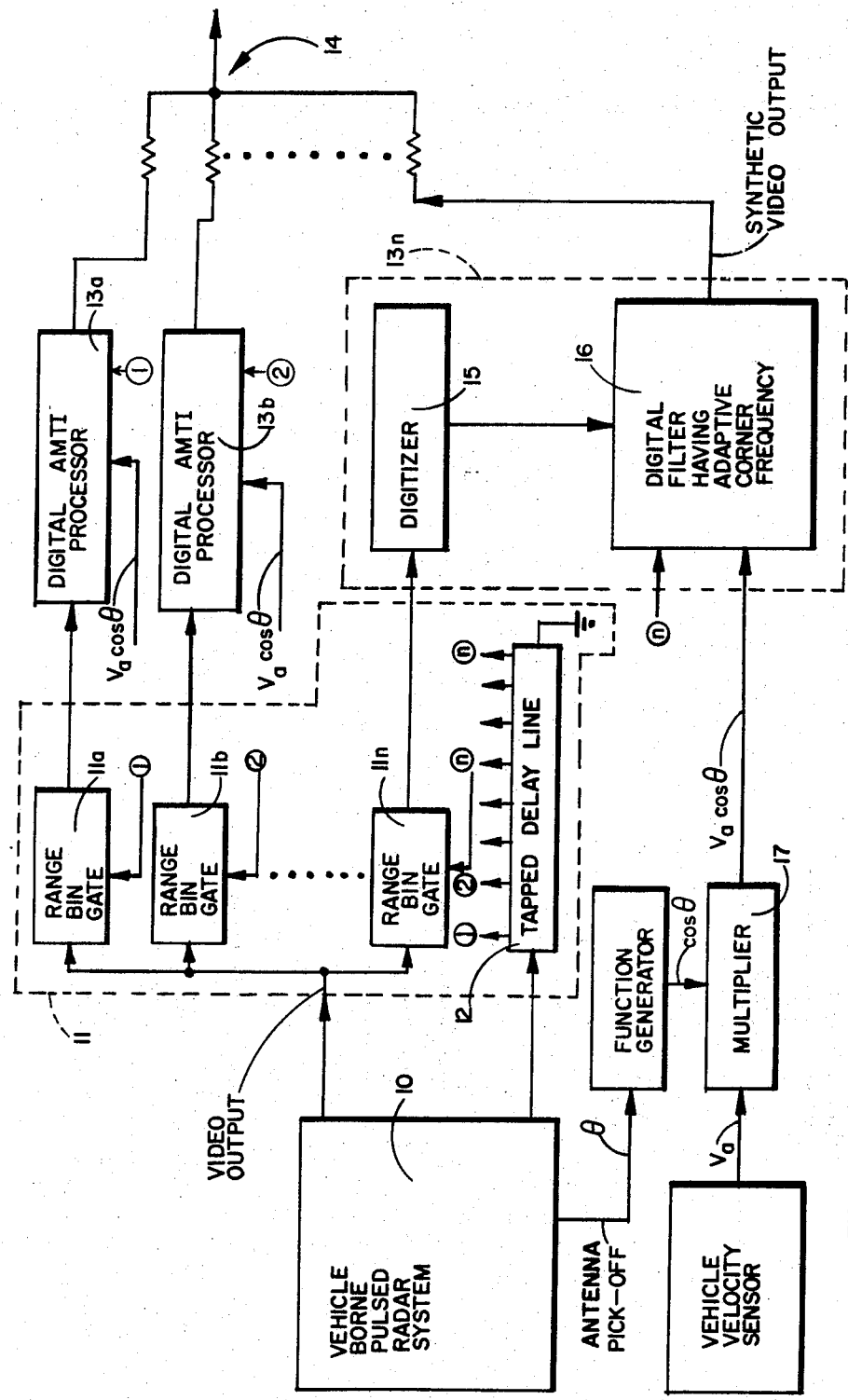
FIG. 1 is a block diagram of a system embodying the inventive concept.

Referring now to FIG. 1, there is illustrated in block diagram form a system embodying the inventive concept. There is provided a pulsed energy ranging system 10, such as a radar system adapted for airborne use and providing a clutter-referenced video output. Such means for providing a clutter-referenced video output may comprise a non-coherent system, as disclosed more fully in application Ser. No. 391,073 filed Aug. 18, 1964, by F. J. Dynan et al., assignors to North American Aviation, Inc., assignee of the subject invention; alternatively, such means may comprise a coherent system, as disclosed more fully in application Ser. No. 552,556 filed May 24, 1966, by W. R. Fried et al., now U.S. Pat. 3,341,847 issued Sept. 12, 1967. There is also provided range gating means 11 responsive to the system trigger and the video output of the radar system for providing a plurality of range-gated outputs, each output representing range-gate sampling of a successive range bin of a receiver range trace signal.

Range gating means 11 may be comprised of a plurality of range gates $11_a$, $11_b$ and $11_n$ corresponding to the number of range bins by which a received range trace signal is to be divided or sampled, each gate having a gating control input coupled to a source of a gating signal. Such source is shown in the arrangement of FIG. 1 as a tapped delay line 12 responsively coupled to the system trigger of radar system 10 and having a plurality of delayed outputs, each successively delayed relative to a preceding one and corresponding to a successive one of a plurality of range-time intervals or range bins to be sampled, for operation of range gates $11_a$, $11_b$ and $11_n$. Hence, it is to be appreciated that range gating means 11 provides a sampled video output on each of the output lines thereof, the sample on a successive one of the output lines corresponding to a successive range bin of a sampled video range trace signal. Although only three range-gated outputs are shown, it is understood that means may be provided for obtaining as many range-gated outputs as desired.

Figure 2:
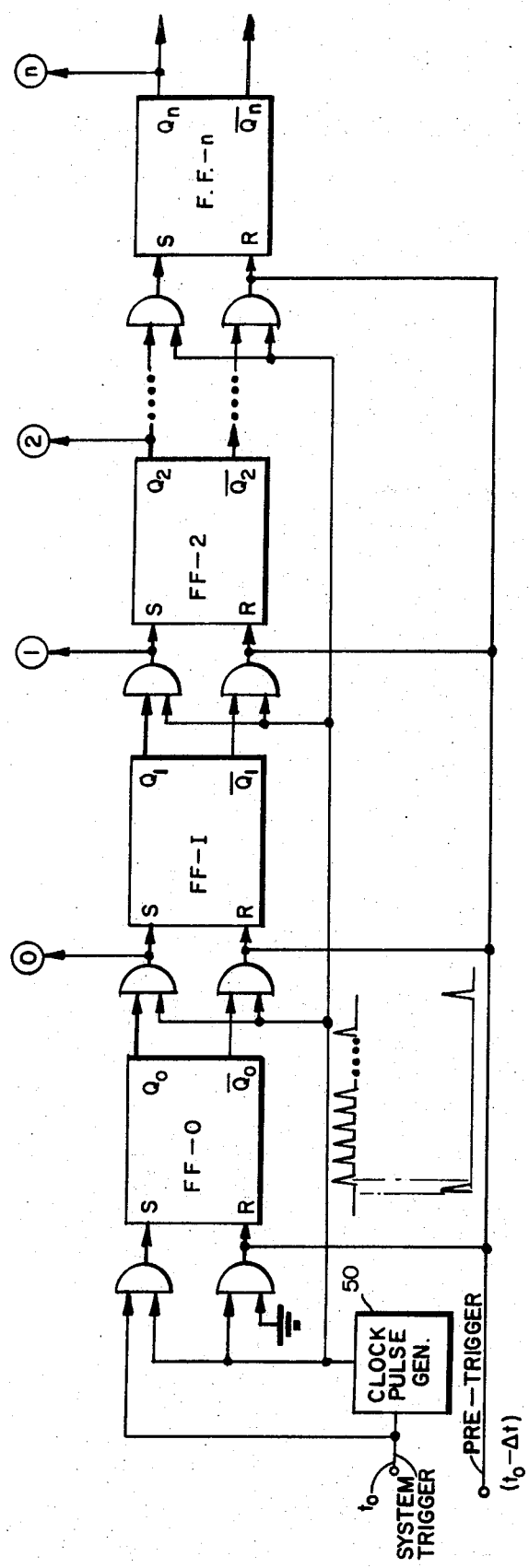
FIG. 2 is a block diagram of an alternate arrangement of the range-gate signalling means of FIG. 1.

Also, although the source 12 of range gating signals has been shown as a tapped delay line in the arrangement of FIG. 1, it is clear that such arrangement is exemplary only and that other means may be employed, such as, for example, digital shift register means, one arrangement of which is shown in FIG. 2. In such alternate range-gate signal source, there is provided a gated oscillator or clock generator 50 responsively coupled to the system trigger of radar system 10 (of FIG. 1) for providing a periodic pulsed output having a periodicity corresponding to the desired range time interval or increment between successive range bins, which serves as a shift pulse source. The shift register itself may be comprised of a series or chain of flip-flops, the 1 state output of each being connected to the reset or 0 input of the succeeding flip-flop of the series, and the 0 state output being connected to the set of 1 input of the succeeding flip-flop, each input of each flip-flop stage being gated by shift pulse source 50. In this way, the output state of each flip-flop provides a corresponding enabling input to the next flip-flop. The next flip-flop, however, cannot respond to the enabling input to assume the state of the preceding flip-flop until the application of a shift pulse during such enabling state. Because of a preselected delay provided by the combined response time of each gate and an associated flip-flop, in responding to the shift pulse, the state change of one flip-flop stage (in response to the coincidence of a changed enable state and a shift pulse) and does not result in concomitant state changes in succeeding ones of the chain of flip-flops. Accordingly, a state-change to the 1 state in flip-flop FF-1 (at a time $t_1$ corresponding to a first range-bin of interest) while producing a change in the enable state input to the second flip-flop stage, does not result in a state change to the 1 state of the next flip-flop FF-2 until the occurrence of the next shift pulse (from source 50) at time $t_2$ (corresponding to a second range bin of interest. At the same time (or within a gate-delay response interval thereafter), such shift pulse also serves to reset the first and enabling flip-flops FF-0 and FF-1. This same sequence occurs in each of successive flip-flop stages in response to a successive one of the series of shift pulses from pulse source 50. In this way, a 1 state or condition is sequentially shifted by a first flip-flop to a next one in a series of flip-flops, and a range gating signal is provided at each of the gate control output lines at that one of a sequence of intervals corresponding to a mutually exclusive one of a series of range bins to be sampled, in accordance with the following table:

|       | FF-1 | FF-2 | ... FF$_n$ |
|-------|------|------|------------|
| $t_o$ | 0    | 0    | 0          |
| $t_1$ | 1    | 0    | 0          |
| $t_2$ | 0    | 1    | 0          |
| ...   |      |      |            |
| $t_n$ | 0    | 0    | 1          |
| $t_o$ | 0    | 0    | 0          |
| $t_1$ | 1    | 0    | 0          |

The construction and arrangement of shift registers are generally understood, as indicated at page 246-247 of "Logical Design of Digital Computers" by Montgomery Phister, Jr., published by John Wiley and Sons, Inc., 1958, and at page 20, 21 of The Digital Logic Handbook, 1966-67 Edition, published by Digital Equipment Corporation of Maynard, Mass., and in U.S. Pat. No. 3,295,107 issued Dec. 17, 1966, to R. E. Stalcup.

The range gated video signal at each of the outputs of range-gating means 11 is fed to a mutually exclusive one of a plurality of digital AMTI processors 13a, 13b and 13n for digital doppler processing of the sampled or ranged video signal, and generation of a synthetic video signal in synchronism with a mutually exclusive one of the range-gating control signals and indicative of a moving target within the range bin corresponding to such range gating control signal. Accordingly, by combining the synthetic video outputs of doppler processors 13a, 13b and 13n by means of signal combining means 14, a doppler-processed video range trace signal is provided.

Each of like digital processors 13a, 13b and 13n is comprised of a digitizer 15 coupled to the output of an associated one of range gates 11a, 11b, 11n; and a digital filter 16 coupled to the output of digitizer 15 and having an adaptive lower bandpass frequency. Digitizer 15 provides the triple functions of digitzing the sampled video data, delay line cancelling the zero frequency or d-c component of the video envelope of the digitized video sample, and thresholding of the non-zero frequency component of the digitized video envelope. Digitizer 15 may also serve the additional function of upper band pass limiting the video envelope. Digital filter 16 serves the triple functions of further bandpass limiting the threshold digitized signal, automatically adjusting the bandpass in response to an arbitrary function, and generating a synthetic video output pulse in synchronism with the periodic range time interval associated with the range gated video input to the digital processor. By reason of these latter two functions, filter 16 is further responsively coupled to a multiplier 17 and to range gate control means 12.

Figure 3:
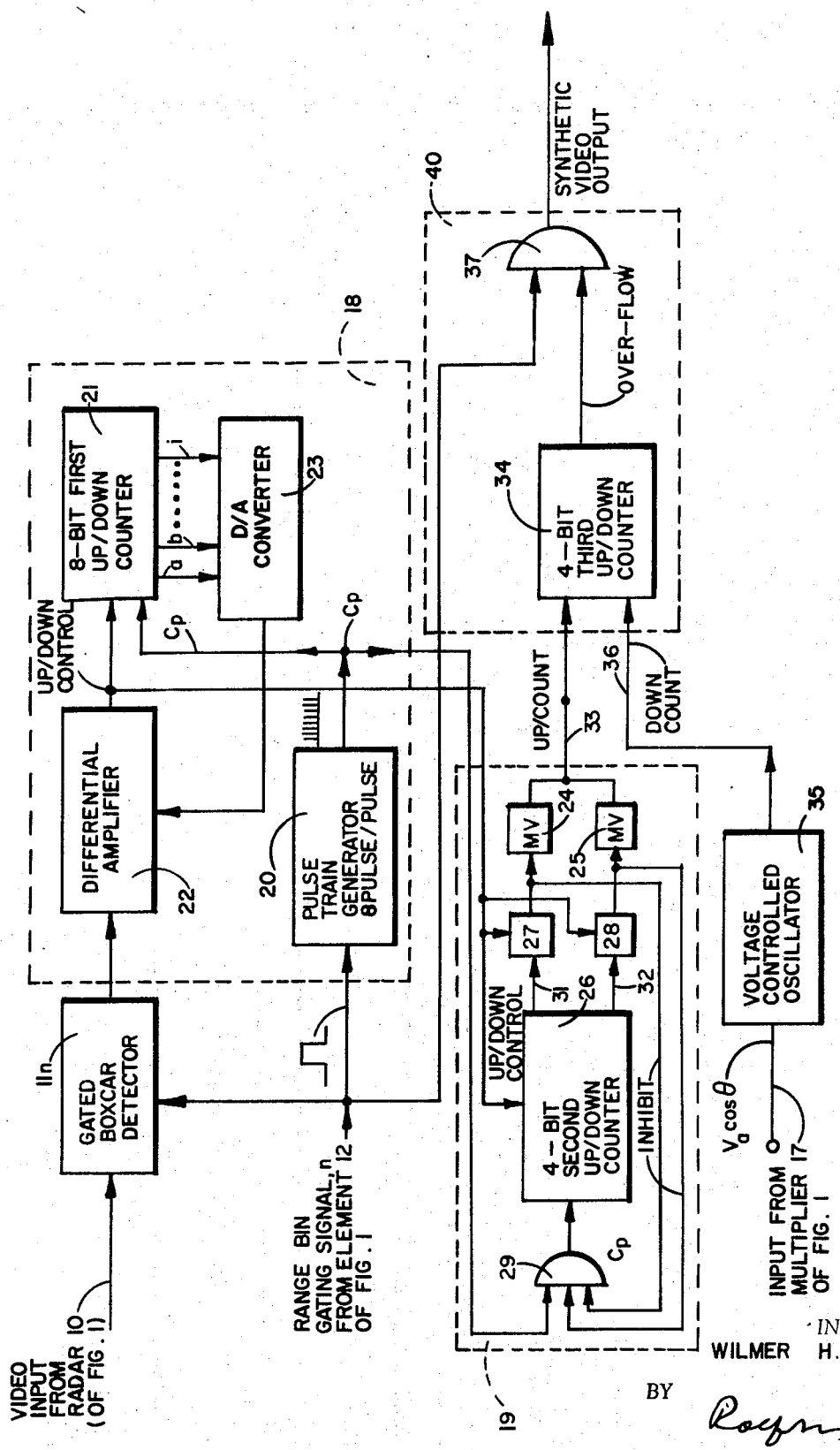
FIG. 3 is a block diagram in further detail of a portion of the digital AMTI processor of FIG. 1.

The construction and arrangement of digital processor 13n is shown in further detail in FIG. 3. Each of digital processors 13a, 13b and 13n are similarly constructed and arranged, and therefore, a further description in detail of only processor 13n will suffice.

Referring to FIG. 3, there is illustrated in block diagram form a schematic arrangement of doppler processor 13n of FIG. 1. There is provided a closed loop analog-to-digital (A/D) converter 18 and a trigger generator 19, comprising digitizer 15 of FIG. 1. A/D converter 18 is comprised of a pulse train generator or burst oscillator 20 responsive to a preselected range bin gating signal output (from range gate control means 12 of FIG. 1) for providing a pulse train input into an up-down counter 21 having an up/down control input responsively coupled to the output of an analog differential amplifier 22. Differential amplifier 22 has a first input coupled to that range-gated video sample provided in response to that gating control signal employed as an input to pulse train generator 20, and has a second input responsive to the analog of the digital value stored in counter 21. The range gate 11n, interposed between differential amplifier 22 and the receiver video output of radar system 10 (of FIG. 1) may be comprised of a gated box car detector in order to both sample and hold the (range-gated) video signal. In this way, the sampled video signal input is temporarily stored long enough for the closed loop A/D converter 18 to respond. The analog of the digital value stored by counter 21 is provided by a digital-to-analog (D/A) converter 23.

In normal operation of closed-loop A/D converter 18, a pulse train of a preselected number of pulses (say, eight pulses) is applied at a clock input of counter 21 in response to a range gate trigger applied to gated burst oscillator 20, thereby causing counter 21 to count or integrate such applied pulse input, combining such count with the count stored therein from a range-gated input occurring during a preceding pulse repetition interval of pulsed radar system 10 (of FIG. 1). The sense of the difference between the sampled video input (form boxcar detector 11n) and the output of D/A converter 23 is indicated at the output of differential amplifier 22, and employed to control the counting action of counter 21 in such a sense or direction as to tend to reduce the magnitude of the difference between the sampled video and the D/A converter output to zero, as is well understood in the art.

The up-down control signal from differential amplifier 22 is also applied as an input to trigger generator 19 for the generation of a trigger by an appropriate one of monostable multivibrators 24 and 25 in response to each change of sense of the output of differential signalling means 22. Such change of sense will not occur in response to a sampled d-c video envelope at a gated range or range bin of interest, because the difference between a stored video amplitude (at the output of D/A converter 23) and the next range-gated video sample (within such range bin) would be zero, resulting in a null at the output of differential amplifier 22. Therefore, no trigger output would be generated in response to such up-down control signal. If, however, the sampled video input to closed-loop A/D converter 18 has a non-zero frequency (or time-varying) component, such component will result in a change in the sense of the up-down control output of amplifier 22, each sense change being employed by trigger generator 19 to generate a unipolar pulse output. Where such time-varying video component represents a single frequency (or spectral line) then such pulses will be generated by trigger 19 at a periodicity corresponding to twice the single frequency. In other words, the sense of the counter control signal output from amplifier 22 reverses twice each cycle of a single frequency time varying component of a video envelope resulting in a pulse output from generator 19 every half cycle. Hence, A/D converter and trigger 19 cooperate as a pulse canceler to provide a trigger output indicative of only a non-zero frequency component of a sampled video envelope.

Where it is desired to limit or prevent the response of trigger generator 19 to low-level noise or spurious inputs, threshold means may be incorporated in trigger 19 to prevent response thereof to signals below a preselected threshold (corresponding to the residue or skirt of the clutter spectra) or of less than a minimum duration in time (corresponding to system noise). Such signal limiting means in the arrangement of FIG. 3 comprises a four-bit up-down counter 26 having an up-count output 31 coupled to multivibrator 24 by a first threshold comparator 27 and further having a down-count output 32 coupled to multivibrator 25 by a second threshold comparator 28, as well as having an up-down control input coupled to the up-down signal output of amplifier 22.

An output of each of comparators 27 and 28 is fed back to an input of an AND gate 29 which gate is further responsively coupled to the output of pulse train generator 20. Whenever the digitized video envelope goes through a point of infliction (as indicated by a change of state or sense reversal of the control signal output from amplifier 22 of A/D converter 18 of FIG. 1), then counter 26 is reset and commences to count the decrease or change in signal magnitude from the value existing at such point of inflection. A change or output count greater than the preselected threshold setting of an appropriate one of comparators 27 and 28 produces a change in state of the output of such comparator, which is fed to an input of an associated one of multivibrators 24 and 25, resulting in a pulsed output on line 33. Such pulsed output will thus occur twice each cycle for a single (non-zero) frequency video signal, and hence would be periodic in occurrence. Where the amplitude of the (non-zero frequency) single frequency video envelope is below the preselected threshold, no such periodic output will occur on line 33.

A thresholded state in the output of one of comparators 27 and 28, due to the input thereto exceeding the preselected threshold, is employed as an "inhibit" input to logic gate 29. In other words, for an input to a respective one of comparators 27 and 28 below the preselected threshold level, the output state of such comparator comprises an "enable" input to the input logic of counter 26.

Although trigger generator 19 has been described as threshold means for generating two pulses per cycle or one trigger pulse per half cycle of a (non-zero frequency) sample frequency video envelope, the response rate of trigger generator 19 is limited to non-zero frequencies of less than the system PRF of the pulsed transmitter (of system 10 in FIG. 1). In other words, trigger generator 19 tends to cooperate as an upper bandpass limiter. Such limited response is obtained by limiting the speed of the pulse train provided by pulse train generator 20 in cooperation with the selection of the threshold of comparators 27 and 28, whereby the counter 26 cannot respond rapidly enough to higher frequency threshold amplitudes to provide a counter output at least as great as the preselected threshold. In this way, the response of trigger generator 19 is limited to no more than one pulse output per system pulse repetition interval, corresponding to one pulse per half cycle for a single video frequency not exceeding the system PRF.

The upper bandpass limited output 33 of trigger generator 19 is fed to an up-count input of an output counter 34 of a synthetic video signal generator 40, a down-count input of output counter 34 being responsively coupled by line 36 to a source 35 of a lower limit frequency. Where the trigger generator output pulse train rate at the up-count input is greater than the down-count pulse train rate of source 35, an overflow condition will ultimately develope at an output of counter 34. The length of time or number of system pulse repetition intervals required for such overflow condition to develop depends upon the amount of the frequency difference between the up-count and down-count pulse trains and the most significant bit or preselected capacity of the counter 34.

The overflow condition of output counter 34 may be gated by the range bin gating signal by means of a coincidence gate 37, to generate a synthetic video output signal at a range time corresponding to the range-bin sampled by the range-gating signal. Where, of course, the periodic output of trigger generator 19 corresponds to a vdeo envelope spectral component below the frequency of source 35, then no overflow condition occurs at the output of counter 34, and no synthetic video is generated at the output of gate 37. Hence, it is to be appreciated that synthetic video signal generator 40 cooperates with the upper bandpass limited output of trigger generator 19 and the single frequency output of oscillator 35 as a bandpass limited filter, the upper cut-off or limit frequency of which corresponds to (PRF/2) and the lower cut-off or limit frequency of which corresponds to the periodicity of oscillator 35.

Figure 4:
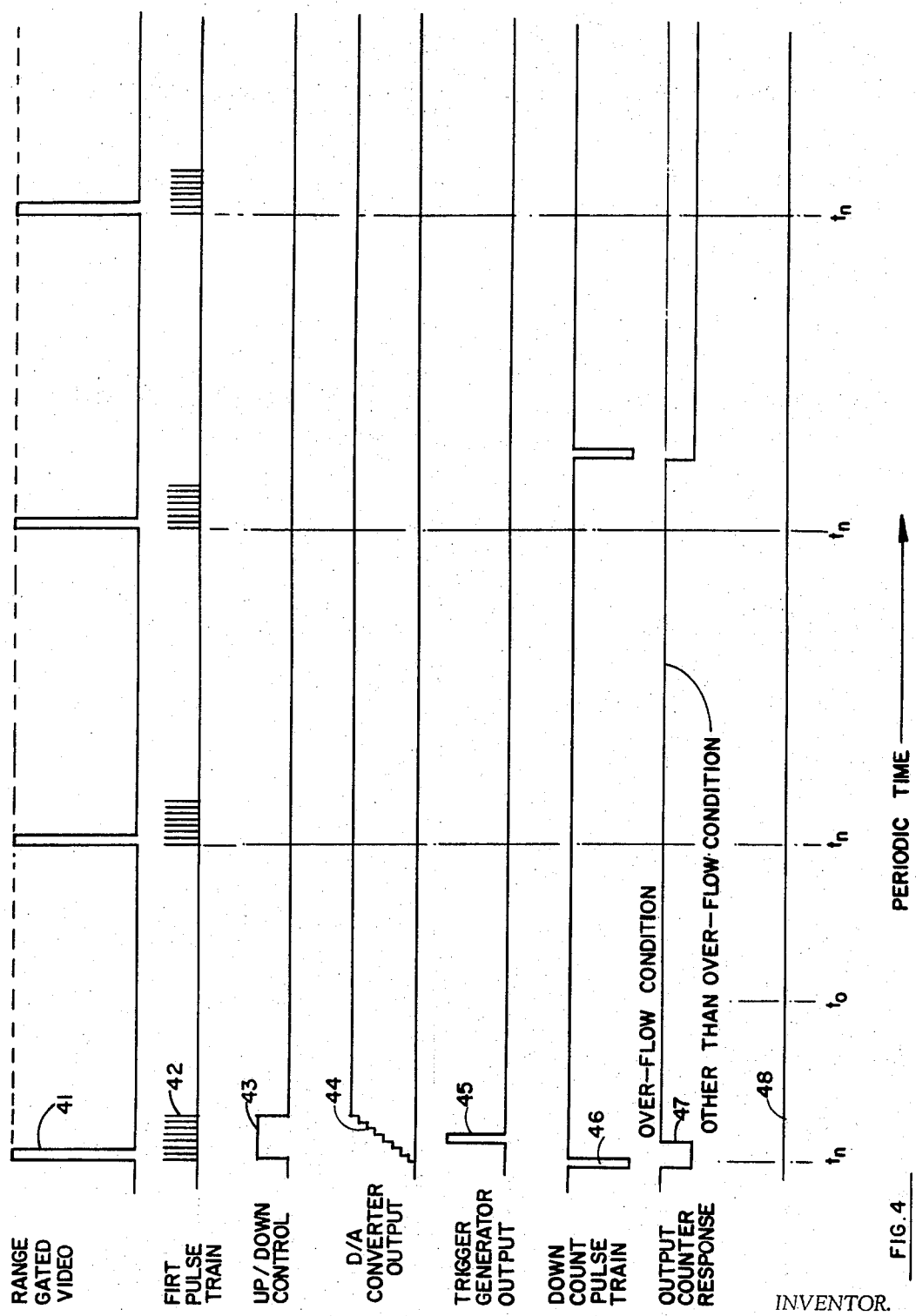
FIG. 4 is a family of time histories illustrating the response of the device of FIG. 3 to a clutter-referenced clutter return.
Figure 5:
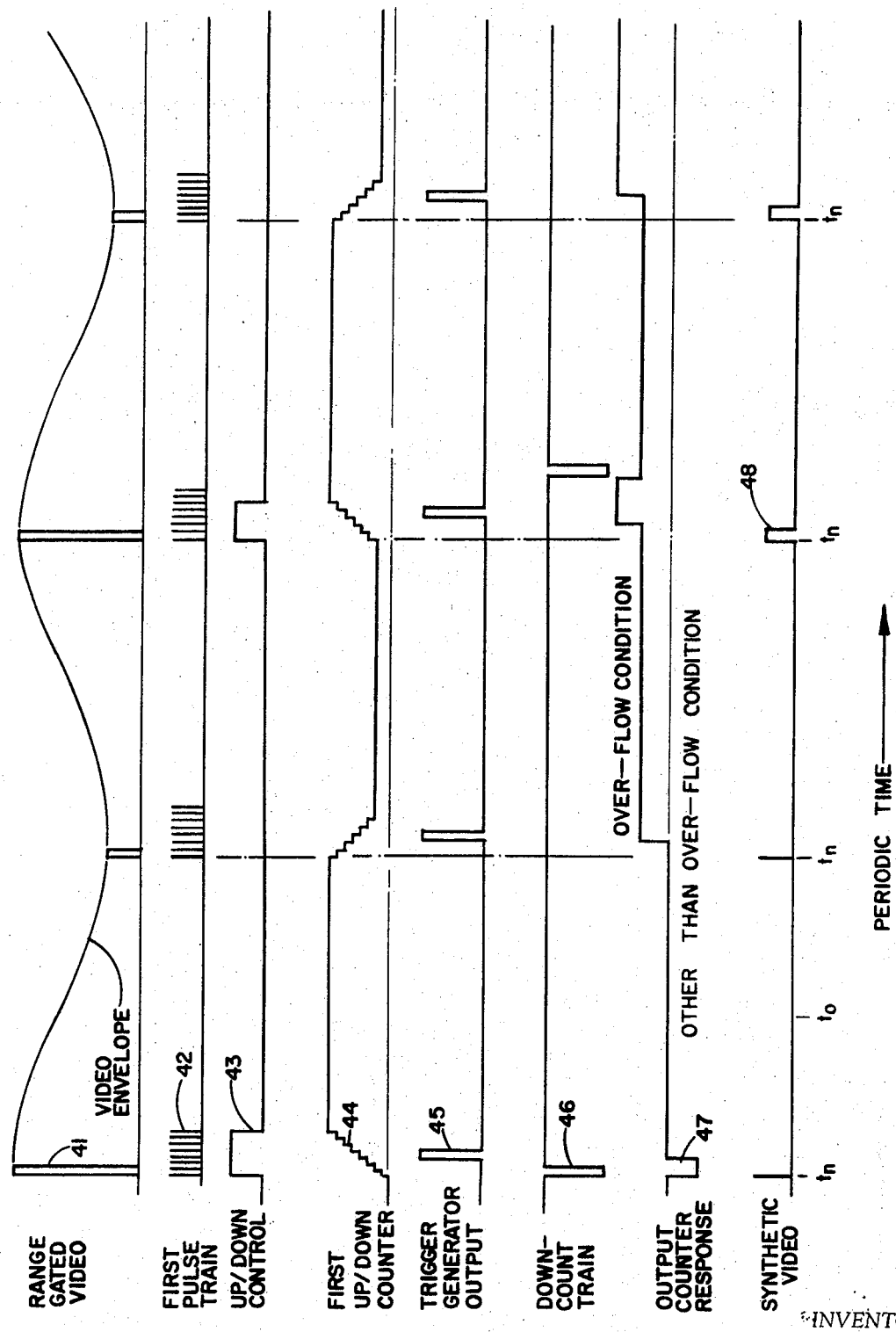
FIG. 5 is a family of time histories illustrating the response of the device of FIG. 3 to a clutter-referenced maximum speed moving target signal.
Figure 6:
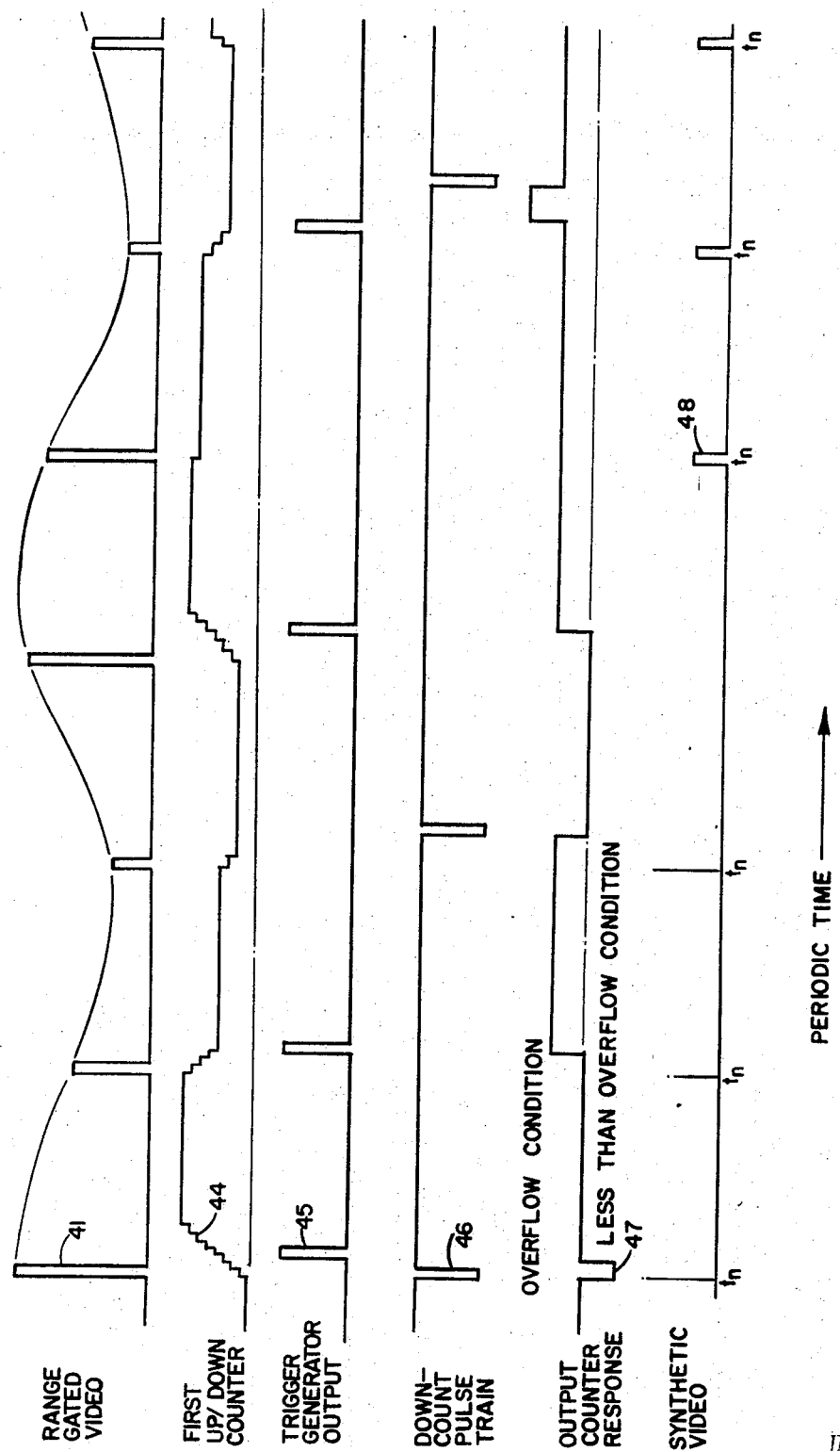
FIG. 6 is a family of time histories illustrating the response of the device of FIG. 3 to a clutter-referenced intermediate-velocity moving target signal.

The cooperation of elements 18, 19, 35 and 40 as a digitizer and digital doppler filter may be further appreciated from a consideration of FIGS. 4, 5 and 6.

Referring to FIG. 4, there is illustrated a family of time histories of the arrangement of FIG. 3 to a d-c, or zero-frequency, video envelope as a function of periodic (radar) time. The notation $t_o$ refers to the occurrence of the system trigger of the pulsed energy system 10 (of FIG. 1), while the notation, $t_n$ refers to an exemplary range-gated time or range bin of interest. Curves 41, 42, 43, 44 and 45 respectively represent the respective outputs of gated boxcar detector 11n, clock generator 20, up-down control amplifier 22, D/A converter 23, and trigger generator 19 of FIG. 3. Curves 46, 47 and 48 respectively represent the respective outputs of oscillator 35, output counter 34 and coincidence gate 37. It is to be noted that upon the digitizer integrating that portion of clock pulse train 42 occurring within the up-count control interval of the up control interval of the up control signal 43, no further change occurs in the D/A converter output, because no further changes occur in the video envelope of the sampled video signal 41. Upon the counter 26 of trigger generator 19 (in FIG. 3) counting up to, say, a preselected threshold of four clock pulses of the initial input of clock train 42, an initial pulse output 45 occurs, indicative of the threshold condition being exceeded. However, because no further state change occurs in the video envelope, no further trigger pulses occur in the trigger generator output 45 in FIG. 4. Such lack of a further and periodic output 45 (for trigger generator 19 of FIG. 3) corresponds to the absence of a non-zero frequency component of the thresholded video envelope.

Accordingly, the periodic output 46 (applied to the down-count input of counter 34 of FIG. 3) prevents an overflow condition from occurring at the output 47 (in FIG. 4) of counter 34. Therefore, no synthetic video signal results in the output 48 (in FIG. 4) of the synthetic video signalling means 40 (of FIG. 3).

Where, however, the video envelope represented by the sampled video input has a time-varying, or non-zero frequency, component corresponding to (PRF/2), as shown by curve 41 in FIG. 5, then the up-down control signal 43 changes state in synchronism with such component, resulting in a corresponding time-variation in the output 44 of the D/A converter. The threshold trigger generator 19 responds to provide an output pulse 45 each time the time-varying video component goes through a point of inflection (i.e., a change in the sense of the rate of change) with an associated amplitude change at least equal to the preselected threshold. Such output 45 of trigger generator 19 occurs each half cycle of the (non-zero) single frequency (PRF/2) video component utilized in the example of FIG. 5, resulting in an up-count pulse every system pulse repetition interval of the pulsed energy system 10 (of FIG. 1). The time integral of the difference between the up-count pulse train 45 (at a rate (PRF/2) and a down count pulse train 46 (at a rate less than (PRF/2), eventually results in an overflow condition in the output 47 (in FIG. 5) of the output counter 34 (of FIG. 3). Such overflow may be preselected at any level to assure a noise-free output reliably indicative of a moving target. In FIG. 5, at least a single pulse count difference or level has been employed which, in coincidence with the range-gate signal occurrence (at periodic time $t_n$) at coincidence gate 37 (of FIG. 3), results in the generation of a synthetic video pulse 48 at range time $t_n$ (in FIG. 5).

Where the (non-zero) single frequency component of the video envelope is less than one-half of the down count pulse train, of course no overflow condition will occur in the output 34 and no synthetic video pulse will result at the output of gate 37.

As shown in FIG. 6, where a (non-zero) single-frequency component of the video envelope is less than one-half the system PRF, but yet greater than one half the frequency of the down count pulse train, the build-up to an overflow condition in the output 47 of the output counter in coincidence with the range gate time $t_n$ requires more system pulse repetition intervals in which to generate the first one of the synthetic video pulses 48.

Figure 7:
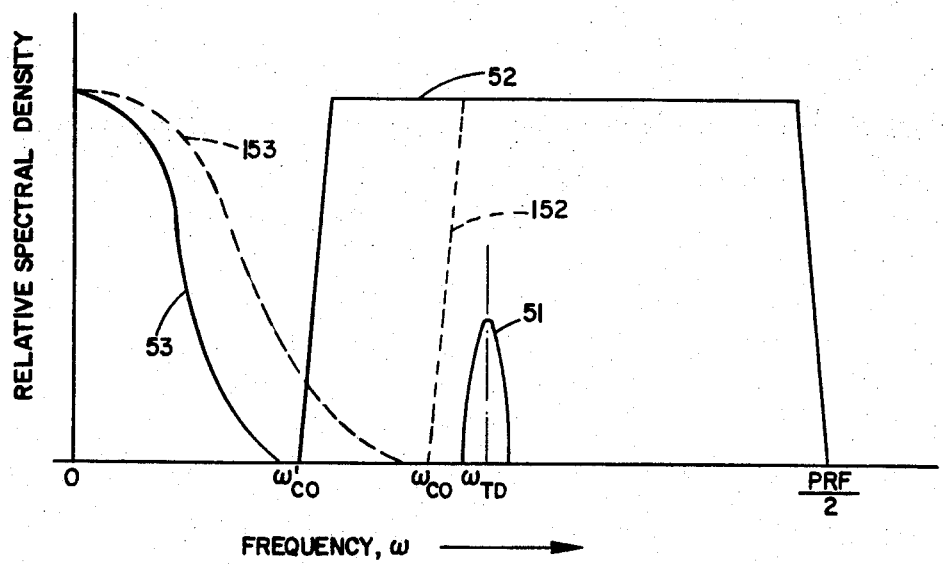
FIG. 7 is a spectral diagram of a clutter referenced moving target video signal, corresponding to an output of system 10 of FIG. 1.

Such synthetic video condition of FIGS. 5 and 6 corresponds to the spectral situation illustrated by cusp 51 in FIG. 7, which is seen to lie within the filter bandwidth of curve 52 (between $\omega_{co}$ and (PRF/2). The low frequency clutter cusp 53, seen to be folded about zero or d-c in FIG. 7, is in general spread spectrally about zero, rather than being limited to a single spectral line at zero frequency, as is well understood in the AMTI system art. Although the clutter cusp 53 is shown as not extending above the lower bandpass limit, or cut-off, frequency $\omega_{co}$, the skirt or spectral edge of such cusp actually may have a finite signal level extending into the filter bandpass 52, for which reason the above described thresholding of the digitizer is to be preferred. In this way, the broadest practical bandpass (or lowest cut-off frequency $\omega_{co}$) may be used in order to maintain surveillance over the broadest range of doppler speeds for which a moving target may be detected. Where, however the spectral spread of the clutter cusp increases (as shown by curve 153 in FIG. 7), due to increases in the look-angle or platform velocity of a utilizing AMTI pulsed energy system, then it may be preferable to increase the filter lower-limit or cut-off frequency, as indicated by $\omega'_{co}$, thus restricting the filter bandpass (curve 152 in FIG. 7).

Such variation in the video bandpass characteristics of the digital doppler filter of FIG. 3 may be achieved by employing a voltage controlled oscillator for source 35, and responsively coupling the control terminal thereof to means 17 for generating a control signal indicative of the product $V_a \cos \theta$ of the platform velocity and cosine of the system look-angle, as shown in $V_a$ and cosine of the system look angle, as shown in FIG. 1. Such means may comprise a signal multiplier 17 having a first input responsive to a signal indicative of platform velocity and a second input responsive to a function generator providing a signal indicative of the cosine of the system look angle.

The arrangement and cooperation of counters 21, 26 and 34, represented in block form in FIG. 3 for convenience, are generally understood in the art. However, exemplary arrangements thereof are more fully illustrated in FIGS. 8, 9 and 10.

Figure 8:
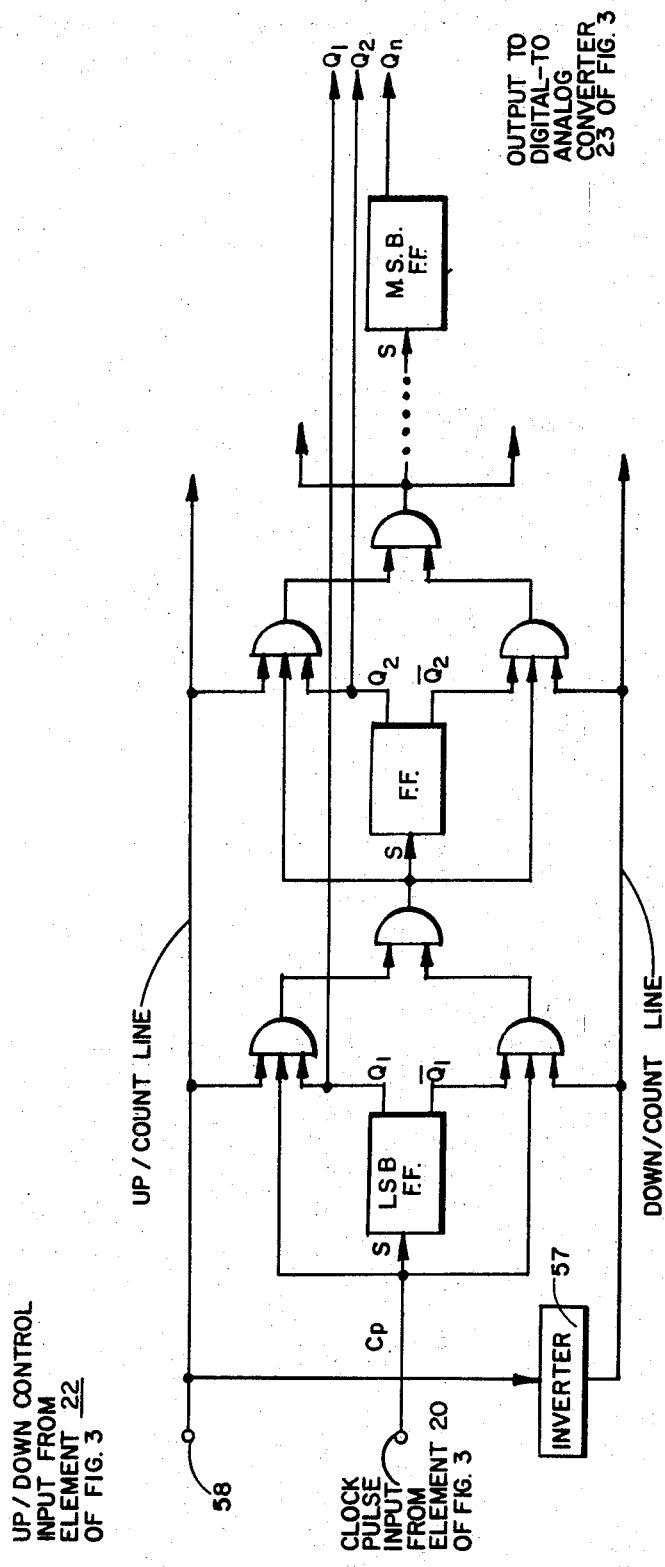
FIG. 8 is a schematic arrangement in block diagram of an exemplary up-down counter, corresponding to block element 21 of FIG. 3.

Referring to FIG. 8, there is illustrated in schematic form an exemplary arrangement of counter 21 of FIG. 3, comprising a least-significant-bit flip-flop (LSB FF), most-significant-bit flip-flop (MSB FF), intermediate flip-flop stages and associate logic gating, whereby successive clock pulse inputs $c_p$ to LSB FF produce alternate input states of such flip-flop a binary count of which is carried on by successive flip-flop stages. A selected polarity stage of the up-count line inputs to the flip-flop gating logic assures that a preselected flip-flop state is associated with a "count-up" in a successive flip-flop stage, while the down-count line, connected to the up/down control terminal by an inverter 57, provides a reversal of the flip-flop state sequence or binary count associated with a reversal of the polarity state of an up/down control input applied to control terminal 58. Such arrangement of basic binary counting element 21 may be employed in each of the arrangements of counters 26 and 34 as shown in FIGS. 9 and 10.

Figure 9:
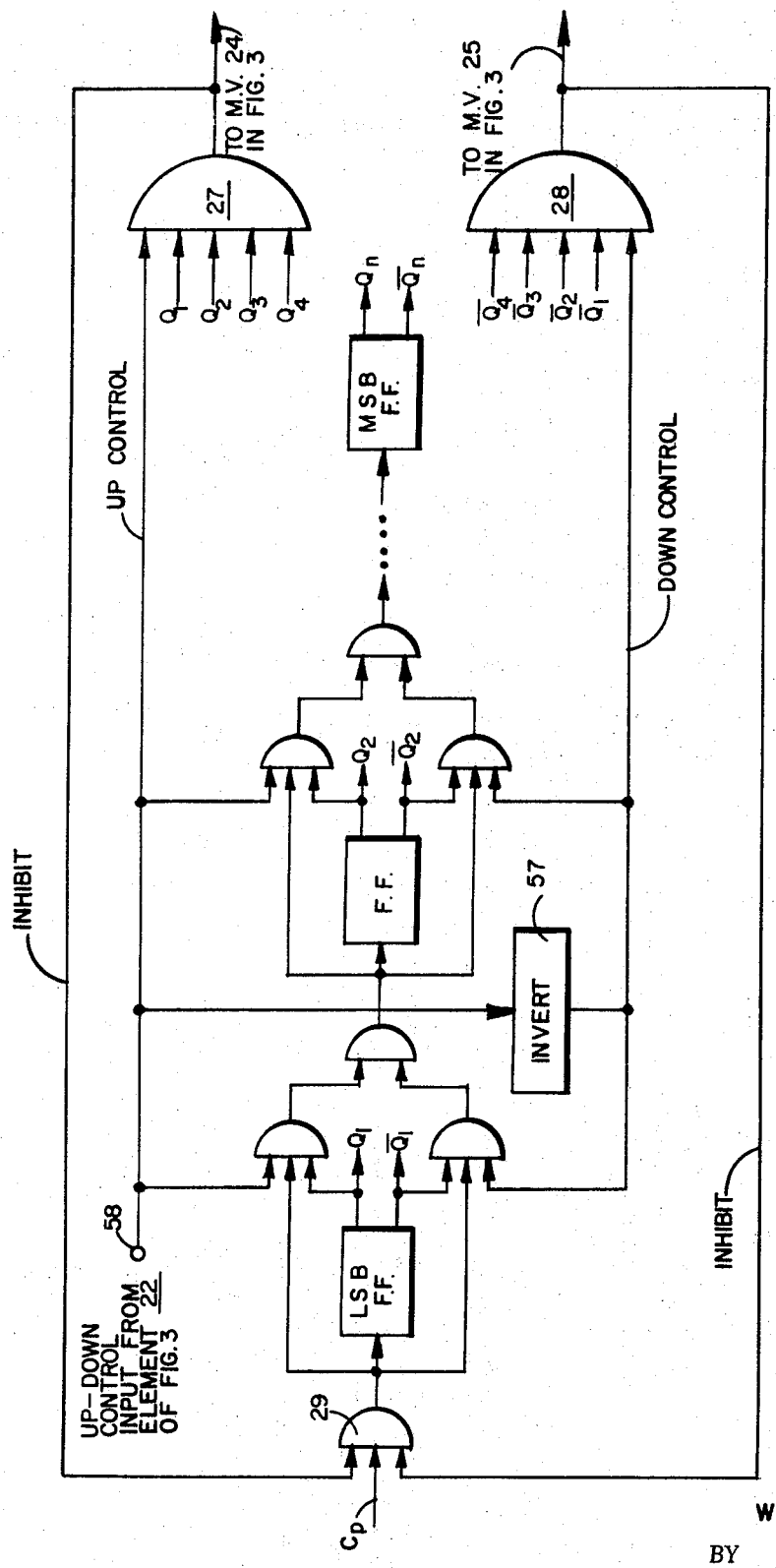
FIG. 9 is a schematic arrangement of an exemplary counter corresponding to block elements 26, 27, 28 and 29 of FIG. 3.

Referring to FIG. 9, there is illustrated a portion of pulse generator 19 of FIG. 3, including a counter 26 arranged substantially in accordance with that of FIG. 8, an input gate 29, and comparators 27 and 28. Comparators 27 and 28 are seen to be essentially logic gates responsive to the counter stage for providing a two-state output indicative of a preselected counter stage corresponding to a threshold count-down occurring during a selected state of an up-down control input applied to control terminal 58. The subsequent preselected count associated with a given change of the control signal state and applied to gates 27 and 28, corresponds to a change from a point of inflection in the video envelope indicative of a non-zero frequency component in excess of the threshold level. The resultant state of a corresponding one of gates 27 and 28 inhibits gate 29, whereby no further clock pulse inputs $c_p$ are applied to the counter. A subsequent and further reversal of the state of the control input at terminal 58 removes such inhibit feedback signal as to allow the application of further clock pulse inputs $c_p$ to the counter, while reversing the counting direction or sense thereof. Thus a complimentary counting state is employed with such opposite polarity or control state of the control signal by a second one of gates 27 and 28, to generate an inhibit signal when the video envelope deviation from a second point of inflection exceeds the preselected threshold. Such means of indicating a periodic video component having an amplitude in excess of a preselected threshold conceptually differs from prior art means which determine the occurrence of a bipolar signal level of a preselected amount above a null. An advantage of the disclosed technique for measuring a deviation from a point of inflection is the ability to respond to a selected spectral content including more than a single frequency, while providing an identification of such spectral content.

Figure 10:
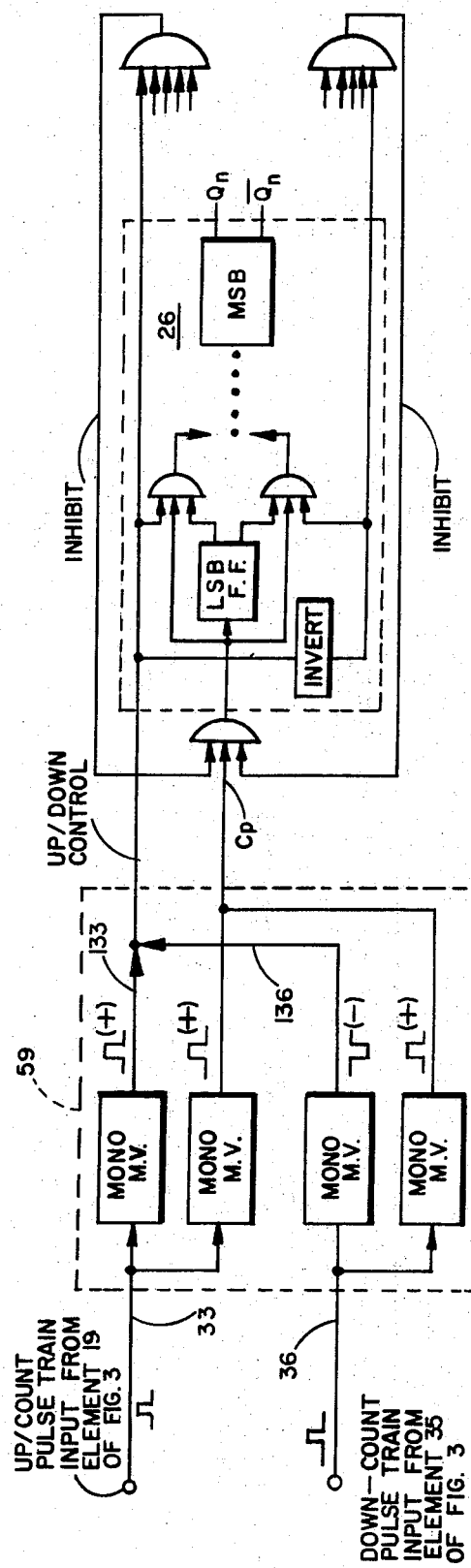
FIG. 10 is a schematic arrangement of an exemplary counter corresponding to block element 34 of FIG. 3.
Figure 11:
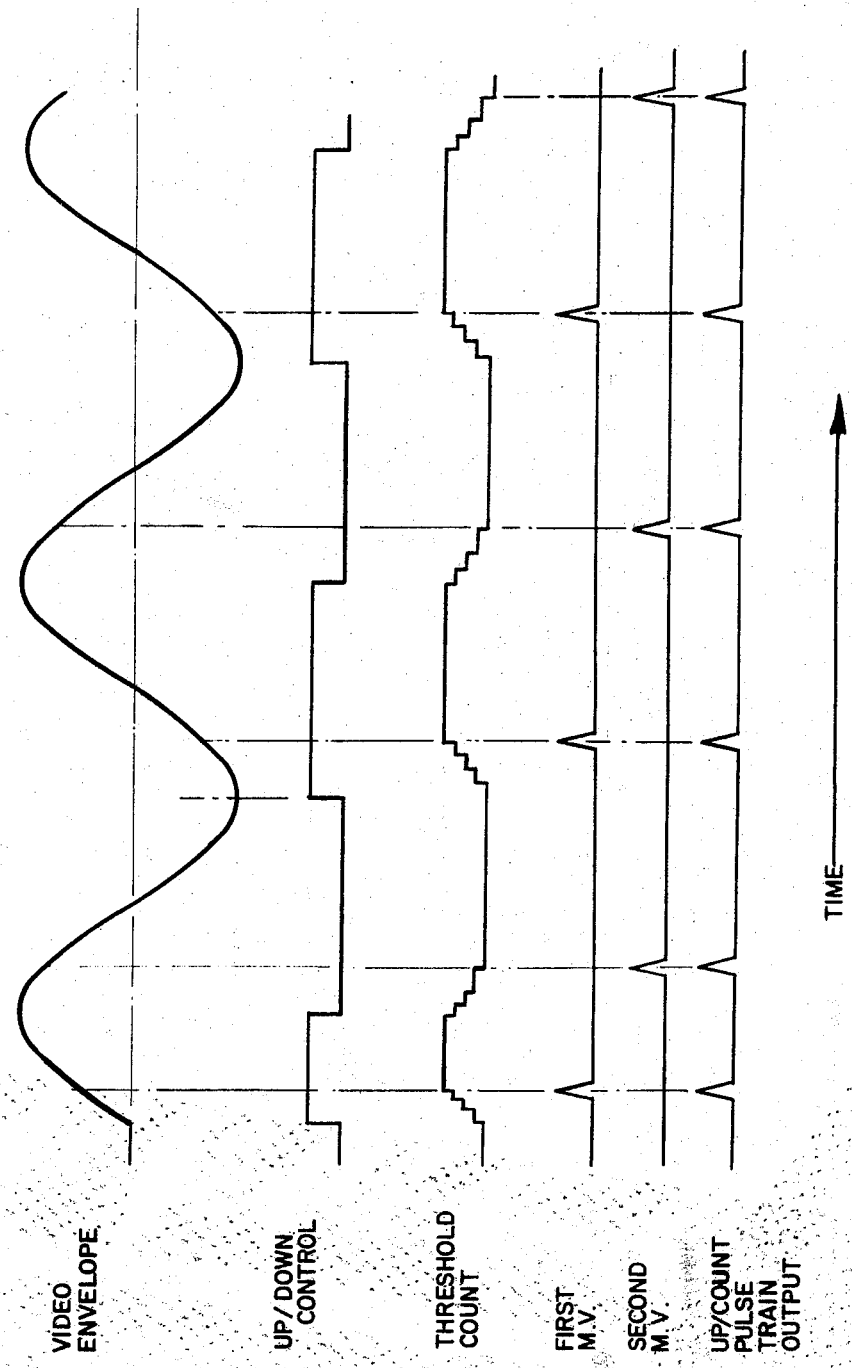

The output counter 34 of FIG. 3, as disclosed more fully in FIG. 10, is seen to comprise the basic counter of FIG. 9, and pulse translating means 59 for commonly employing both the up-count and down-count pulse trains of like unipolar clock inputs $c_p$ to the gated counter 26, while utilizing the up-count pulse train (on line 133) as an up-count control signal (of a first sense) and employing the down-count pulse train (on line 136) as a down-count control signal (having a sense opposed to that of the up-count control signal). Where, however, the normal state of the counter is a down-count state (in the absence of an up-count control input on line 133), then an explicit down-count control input line 136 need not be employed.

Accordingly, it is to be appreciated that there has been described digital means for the doppler processing of the range gated video output of a pulsed energy system. Although the device has been described in terms of the response to a sampled video envelope having only a single frequency component, it is to be understood that such description is exemplary only, and that the device functions satisfactorily as a bandpass filter for any video envelope. Also, the filter process of the digital means disclosed does not rely on the storage of a plurality of successive range-gated range-traced signals, but employs only the storage of that single range trace signal immediately preceding a currently sampled range-trace signal. Further, no digital equivalent of an analog filter network is employed, and hence filter "ringing" problems are avoided; and the lower corner frequency of the bandpass of such filter may be conveniently adjusted. Moreover, the use of a thresholded digital counting device for generation of a synthetic video reduces the likelihood of noise and extraneous outputs in the doppler processed synthetic video signal. Therefore, an improved digital filter has been disclosed.

Although the digital doppler processor and associated pulse train generator have been described in terms of processing a single range-bin, with a plurality being required for the range-bins of a range trace signal, it is to be understood that such device may be time-shared between a number of range-bins, whereby a fewer number of such devices are required to implement the inventive concept. Such time-sharing possibility arises due to the small portion of the pulse repetition interval imployed by the trigger generator (burst oscillator) to generate the clock pulses utilized.

Although the invention has been described and illustrated in detail, it is to be clearly understood that the same is by way of illustration and example only and is not be taken by way of limitation, the spirit and scope of this invention being limited only by the terms of the appended claims.

I claim:

1. In a video sampled data system, digital filter means for indicating the presence of a spectral component in the video envelope of the output of said system and above a preselected lower limit frequency, and comprising:

digitizer means responsive to the amplitude and sampled interval of the sampled video of said system for providing a pulse output indicative of a non-zero frequency component of said video envelope;

periodic pulse generating means having a periodicity corresponding to a selected lower limit bandpass frequency; and an up-down counter having an up count input responsive to the output of said digitizer means and a down count input responsive to the output of said pulse generating means for generating an over flow condition indicative of the presence of a video envelope spectral component in the frequency region above said lower limit frequency.

2. The device of claim 1 in which the periodicity of said periodic pulse generating means is adjustable, whereby said selected lower limit bandpass frequency is correspondingly adjusted.

3. In a video sampled data system, digital filter means for indicating the presence of a spectral component in the video envelope of the output of said system and above a preselected lower limit frequency, and comprising:

a digitizer means responsive to the amplitude and sampled interval of the sampled video of said system for providing a pulse output indicative of a non-zero frequency component of said video envelope above a preselected threshold amplitude;

periodic pulse generating means having a periodicity corresponding to a selected lower limit bandpass frequency; and an up-down counter having an up count input responsive to the output of said digitizer means and a down count input responsive to the output of said pulse generating means for generating an overflow condition indicative of the presence of a video envelope spectral component in the frequency region above said lower limit frequency.

4. In a periodically sampled video signalling system, a bandpass limited digital filter having an upper and a lower cut-off frequency and comprising digitizer means responsive to the sampled video signal and to the sampling periodicity of said signalling system for providing a pulse train indicative of a non-zero-frequency spectral content of said sampled video signal less than one-half the frequency at which said sampled video signal is sampled; and synthetic video means responsive to said sampling periodicity and to said non-zero-frequency pulse train for providing an output pulse in synchronism with said sampling periodicity.

5. The device of claim 4 in which said synthetic video means includes means for limiting the lower cut-off frequency of the bandpass of said digital filter and comprising a reference periodic pulse generator having a frequency less than one-half the sampling frequency of said sampled signalling system and corresponding to a lower limit frequency of the bandpass of said filter;

an up-down counter having an up-count and a down-count input, one of said inputs being responsive to a pulse train output of said digitizer and a second input responsive to a pulse train output of said reference pulse generator; and coincidence signalling means responsive to said sampling periodicity and a preselected condition of said counter for generating an output signal.

6. The device of claim 5 in which the frequency of said reference periodic pulse generator is adjustable, whereby said lower cut-off frequency of said digital filter may be correspondingly adjusted.

7. The device of claim 6 in which there is further included means for varying the frequency of said reference periodic pulse generator as a function of the velocity of a utilizing vehicle.

8. The device of claim 6 in which there is further included means for varying the frequency of said reference periodic pulse generator as a function of the look angle of a utilizing sensor system.

9. The device of claim 6 in which there is further included means for varying the frequency of said reference periodic pulse generator in accordance with the product of vehicle velocity and cosine of sensor look angle of a utilizing sensor mounted on a moving platform.

10. The device of claim 4 in which said digitizer includes means for inhibiting said non-zero-frequency indicating pulse train output in response to only a non-zero-frequency component of said sampled video signal of less than a preselected threshold.

11. In a periodically sampled video signalling system, digital means for generating a synthetic video signal in response to a sampled video input having a spectral component within a bandwidth region below the sampling frequency at which said video input is periodically sampled, and comprising pulse train generator means responsive to said sampling frequency for providing a first pulse train;
a first up-down counter responsive to said pulse train for generating a digital output indicative of the integral of the pulse train input thereto and having a control input;
a differential amplifier responsive to the analog amplitude of each of said sampled video input and said digital output of said first counter for providing an up-down control signal to said control input of said first counter;
trigger generator means responsive to said differential amplifier for providing a pulse output in response to each change of sense of said up-down control signal; and
coincidence signalling means responsive to the coincidence of the sample interval of said sampled video input and a preselected state of said pulse output of said trigger generator for generating a synthetic video output.

12. The device of claim 11 in which said coincidence signalling means comprises an output up-down counter having one of an up-count and a down-count input coupled to a source of a reference periodic signal, the other of said inputs being coupled to the output of said trigger generator means; and
a coincidence gate having a first input coupled to said pulse train generator means and a second input coupled to an output of said second up-down counter.

13. The device of claim 12 in which said downcount input of said output counter is coupled to a reference periodic signal source having a variable periodicity.

14. The device of claim 11 in which said coincidence signalling means comprises an up-down counter having an up-count input responsive to the output of said trigger generator means and a down count input responsive to the output of reference periodic signal source having an adjustable periodicity; and
a coincidence gate having a first input coupled to an output of said output counter and a second input responsive to the sampled interval of said sampled video signal for providing a synthetic video output in response to the coincidence of a preselected overflow condition of said second counter and said sampled interval.

15. The device of claim 11 in which said trigger generator includes threshold means for limiting said trigger output response thereof to system sampled video inputs representing a non-zero frequency component video envelope and having at least a preselected threshold amplitude.

16. The device of claim 11 in which said trigger generator means is further responsive to said pulse train generator means and includes threshold means for limiting said pulse output as a response to a preselected number of pulse outputs of said pulse train generator occurring between subsequent changes of sense of said control signal.

17. The device of claim 11 in which said trigger generator comprises a second up-down counter responsive to said control signal output of said differential amplifier and to said pulse train generator means for indicating the integral of each pulse train associated with a change of sense of said control signal;
threshold comparator means coupled to said second counter for inhibiting said counter in response to an output thereof exceeding a preselected threshold; and
monostable signalling means for generating a trigger output in response to said threshold response to said comparator means.

18. In a periodically sampled video signalling system, digital means for generating a synthetic video signal in response to a sampled video input having a spectral component within a bandwidth region below the sampling frequency at which said video input is periodically sampled, and comprising pulse train generator means responsive to said sampling frequency for providing a periodic pulse train;
a first up-down counter responsive to said pulsed train for generating a digital output indicative of the integral of a pulse train input thereto and having an up-down control input;
a differential amplifier responsive to the analog amplitude of each of said sampled video input and said digital output of said first counter for providing an up-down control signal to said control input of said first counter for closed loop control thereof;
trigger generator means responsive to said frequency generator means and said differential amplifier for providing a second pulsed output; and,
coincidence signalling means responsive to the coincidence of said sampled interval of said sampled video and an output of said trigger generator for generating a synthetic video output.

19. Digital doppler processing means for utilization in a spaceborne moving target indicating type of pulsed-energy ranging system, and comprising range gating means responsive to both a video receiver output and a system trigger of said pulsed energy system and having a plurality of range-gated outputs, each representing range-gate sampling of a successive range bin of a receiver range trace signal;

a like plurality of digital filter means as range gated outputs of said range gating means, each said digital filter means comprising a digitizer responsive to a mutually exclusive one of said range gate outputs for providing a pulse train output indicative of a non-zero frequency component of the video envelope of the associated range-gated video output, and coincidence signalling means responsive to the coincidence of the gating interval of said range gate output and a preselected state of the output of said digitizer for generating a synthetic video output; and signal combining means responsive to said synthetic video outputs of said plurality of digital filter means for providing a doppler-processed AMTI range trace signal.

20. The device of claim 19 in which said coincidance signalling means includes bandpass limiting means comprising a voltage controlled oscillator having a periodicity corresponding to a lower limit frequency of a selected bandpass limit of said filter;

an up-down counter having an up count input coupled to the output of said digitizer and a down count input coupled to an output of said voltage-controlled oscillator; and a coincidence gate responsive to a preselected output state of said counter and the gating interval of said range gate output for generating a synthetic video output signal.

21. The device of claim 20 in which there is further included a function generator for generating a control voltage indicative of a preselected function for control of said voltage controlled oscillator.

22. The device of claim 20 in which there is further provided means for varying the frequency of said voltage controlled oscillator in accordance with the product of the platform velocity and cosine of the look angle of said pulsed energy ranging system.

23. The device of claim 19 in which said digitizer includes threshold means for limiting the output response thereof to system sampled video inputs representing a non-zero frequency component video envelope having at least a preselected threshold amplitude.

* * * * *